United States Patent
Derecktor

(12) 
(10) Patent No.: US 6,547,311 B1
(45) Date of Patent: Apr. 15, 2003

(54) ADJUSTABLE AND RELEASABLE CLAMP-ON TRACK ASSEMBLY AND METHOD OF USE WITH A VEHICLE

(75) Inventor: Thomas E. Derecktor, Portsmouth, RI (US)

(73) Assignee: Tracrac Inc., Fall River, MA (US)

( * ) Notice: Subject to any disclaimer, the term of this patent is extended or adjusted under 35 U.S.C. 154(b) by 0 days.

(21) Appl. No.: 09/805,282

(22) Filed: Mar. 13, 2001

(51) Int. Cl.7 .................................................. B60P 7/04
(52) U.S. Cl. ............................ 296/100.12; 296/100.04; 296/100.18; 248/503; 248/229.13; 248/229.23
(58) Field of Search ....................... 296/100.04, 100.06, 296/100.12, 100.18, 43; 248/229.13, 229.23, 228.5, 503

(56) References Cited

U.S. PATENT DOCUMENTS

| | | |
|---|---|---|
| 3,229,994 A | 1/1966 | Klein |
| 3,762,763 A | 10/1973 | Deshores |
| 3,901,548 A | 8/1975 | Seaman, Jr. |
| 4,215,894 A | 8/1980 | Sidlinger |
| 4,398,763 A | 8/1983 | Louw |
| 4,527,827 A | 7/1985 | Maniscalco et al. |
| 4,650,383 A | 3/1987 | Hoff |
| 4,846,431 A * | 7/1989 | Pflieger .................... 248/228.4 |
| 4,969,784 A | 11/1990 | Yanke |
| 4,974,898 A | 12/1990 | Baranski |
| 5,002,324 A | 3/1991 | Griffin |
| 5,052,739 A | 10/1991 | Irwin |
| 5,137,320 A | 8/1992 | Christensen |
| 5,139,375 A | 8/1992 | Franchuk |
| 5,143,415 A | 9/1992 | Boudah |
| 5,152,570 A | 10/1992 | Hood |
| 5,190,337 A | 3/1993 | McDaniel |
| 5,203,603 A | 4/1993 | Hertzberg et al. |
| 5,238,280 A | 8/1993 | Christensen |
| 5,261,719 A * | 11/1993 | Tucker ................... 296/100.18 |
| 5,303,858 A | 4/1994 | Price |
| 5,310,238 A | 5/1994 | Wheatley |
| 5,316,190 A | 5/1994 | Bullock |
| 5,393,114 A | 2/1995 | Christensen |
| 5,494,327 A | 2/1996 | Derecktor |
| 5,560,576 A * | 10/1996 | Cargill ........................ 248/503 |
| 5,636,893 A * | 6/1997 | Wheatley et al. ........... 248/503 |
| 5,701,991 A * | 12/1997 | Helmetsie ............. 248/229.13 |
| 5,860,691 A * | 1/1999 | Thomsen et al. ....... 296/100.18 |
| 6,024,402 A * | 2/2000 | Wheatley ............... 296/100.18 |

* cited by examiner

*Primary Examiner*—D. Glenn Dayoan
*Assistant Examiner*—Greg Blankenship

(57) ABSTRACT

A releasable and adjustable clamp-on track assembly is provided for releasably and adjustably attaching an overhead rack, or the like, to the walls of a vehicle, such as a pickup truck. The clamp-on track assembly includes a track having an elongate body mountable on the side wall of the pickup truck by a clamp member. One end of the clamp member engages the elongate body, while the opposite end of the clamp is supported by the underside of the side wall of the truck. The clamp may be slidably received within a slot formed in the elongate body so that the clamp can be positioned anywhere along the length of the track, as desired. An adjustable fastener may additionally be provided which, when tightened, secures the clamp to the underside of the side wall of the truck in order to mount the track assembly. When the fastener is loosened the clamp is released from engagement with the truck's side wall so that the track assembly may be removed from the truck The clamp member may also be formed of two pieces, with one of the pieces being pivotable relative to the other.

18 Claims, 7 Drawing Sheets

ADJUSTABLE AND RELEASABLE CLAMP-ON TRACK ASSEMBLY AND METHOD OF USE WITH A VEHICLE

DESCRIPTION

1. Technical Field

The invention relates generally to mounting equipment for vehicles, such as pickup trucks and the like, and more particularly to an adjustable and releasable clamp-on track assembly for attaching an overhead rack and/or other accessories to a pickup truck

2. Background of Related Art

Various types of connections are known to attach overhead racks and the like to the walls of a vehicle, such as a pickup truck. For example, overhead racks which are permanently attached to a pickup truck by welding, or the like, are known in the art. Since it is desirable in certain situations for the operator of a truck to be able to adjust, or remove the overhead racks, releasable and/or adjustable overhead racks have also been developed.

One such releasable and adjustable overhead rack is described in U.S. Pat. No. 5,143,415 to Boudah. The Boudah patent discloses two pairs of stanchions slidably mounted on a pair of tracks which are permanently mounted on the side walls of the pickup truck. Each stanchion includes a base which is attached to the track by a nut and bolt fastening arrangement. The track has a cross-shaped slot formed therein which runs the length of the track, the slot receiving the nut for slidably mounting the stanchion to the rail track. At their upper ends, the stanchions support four cross members via four corner elements.

A sliding connection for releasably and adjustably attaching an overhead rack to a pickup truck is also described in U.S. Pat. No. 5,494,327 which is assigned to TracRac, Inc. This patent discloses a track having an elongated tubular body mountable to the side walls of a pickup truck. The mounting means by which the elongated body is mounted to the side walls of the pickup truck include a shim, a bolt, an elastomeric spacer and a bottom plate. A bottom surface of the tubular body bears against the shim which is disposed between the tubular body and an upper edge of the side wall of the pickup truck. The bolt extends through the elongate tubular body and into a stake pocket formed in the side wall of the pickup truck. The elastomeric spacer is disposed over the bolt and between the shim and a lower plate member, and is received within, and substantially fills the cavity of the stake pocket. The bolt is threadingly attached to the bottom plate member such that upon tightening the bolt the bottom plate member moves upwardly towards the shim, which compresses the elastomeric spacer so that the spacer expands laterally outward and engages and grips the stake pocket, thereby mounting the track to the side wall of the pickup truck.

While prior art connections such as the track disclosed in the '327 patent have proven to be effective for releasably and adjustably attaching an overhead rack and the like to a pickup truck, there is continued development to produce connections which themselves are releasable and adjustable in a quick and convenient manner by the truck's operator, while also providing maximum utility for mounting overhead racks and other accessories.

SUMMARY

In accordance with the present invention, there is provided a releasable and adjustable clamp-on track assembly for supporting an overhead rack, or the like, on the walls of a vehicle, such as a pickup truck. The clamp-on track assembly includes a track having an elongated body mountable on the side wall of a pickup truck by at least one adjustable clamp member. The clamp member is designed to be quickly and conveniently disconnected from the side walls of the truck in order to adjust and/or remove the track assembly from the truck.

In one embodiment, the clamp member includes a first portion supported by the elongate body and a second portion engageable with the underside of the truck's side wall. The first portion may preferable include an extension which is received within a slot, or recess, formed along the length of the elongated tubular body, so that the clamp member can be positioned anywhere along the length of the track, as desired. The second portion is preferably pivotable with respect to the first portion so that the clamping member can be located clear of any style bed liner, without sacrificing clamping force. An adjustable fastener may be provided which, when tightened, secures the second portion with the underside of the truck's side wall in order to mount the track assembly and, when loosened, releases the second portion from the underside of the truck's side wall so that the track assembly may be removed from the truck.

The adjustable clamp member allows the track assembly to be attached to the side walls of a pickup truck in a non-permanent manner so that an operator can easily remove and/or adjust the track assembly by releasing and/or adjusting the clamping member.

It is therefore an object of the present invention to provide a track assembly which is adjustably attachable to a pickup truck so that an operator can easily adjust and/or remove the track assembly.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which.

DETAILED DESCRIPTION OF THE ILLUSTRATIVE EMBODIMENTS

Figure 1:
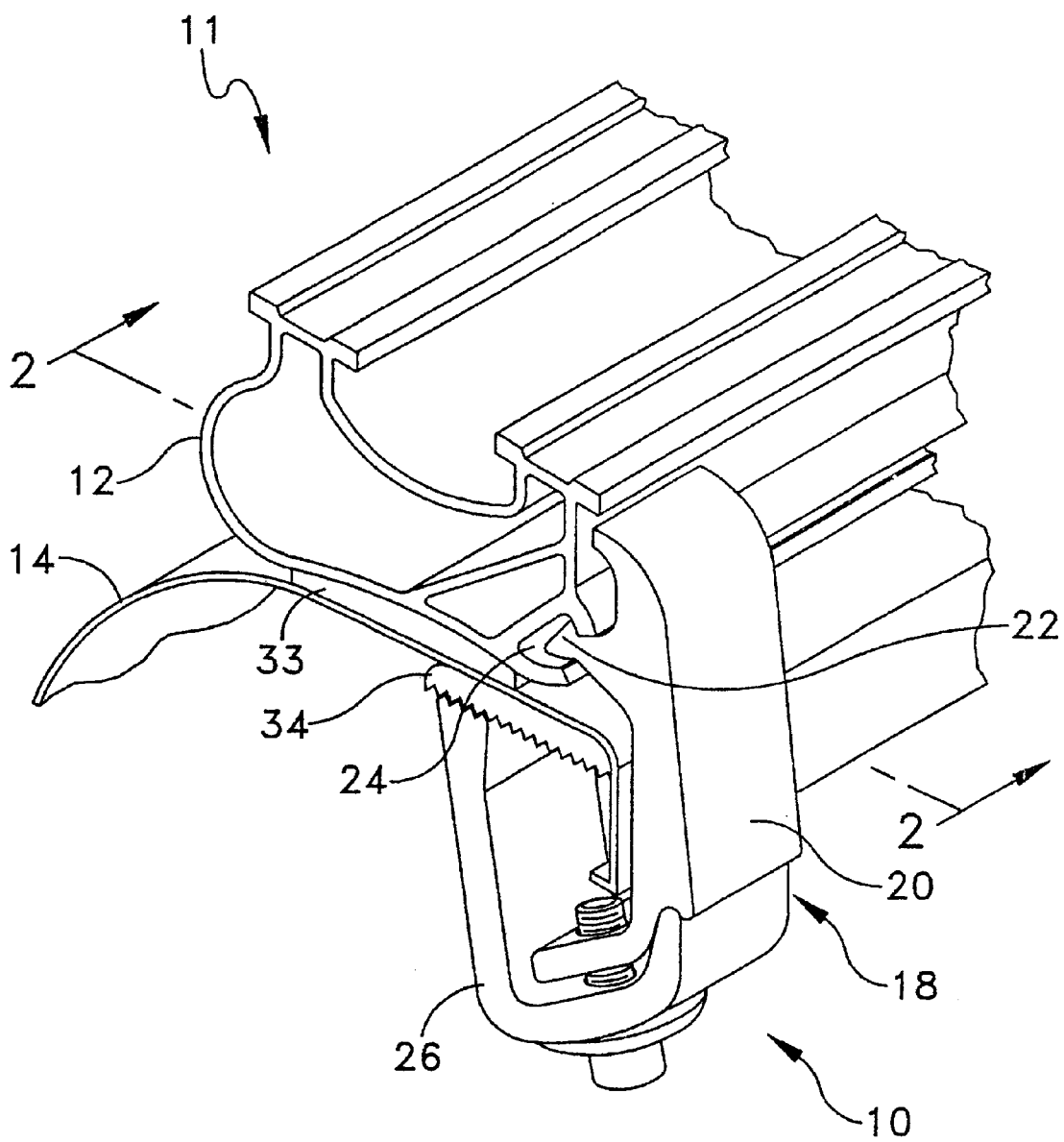
FIG. 1 is a perspective view of a track assembly according to the present invention including a first embodiment of a clamping member.

A releasable and adjustable clamp-on track assembly 10 for attaching an overhead rack, or the like, to the side walls of a vehicle, such as a pickup truck, is illustrated in FIGS. 1–4. The track assembly 10 includes a track 11 having an elongated body 12 mountable on each side wall 14, 16 of a pickup truck by at least one adjustable clamp member 18. Clamp member 18 is designed to releasably attach the track 11 to the side walls of the pickup truck in a non-permanent manner and is further designed to attach the track to a wide variety of pickup trucks, ranging in size and style. In a preferred embodiment, three separate clamp members 18 may be utilized on each sidewall, as discussed in greater detail below.

As illustrated in FIGS. 1–4, clamp member 18 includes a first portion 20 supported by the elongate body 12 and a second portion 26 engageable with the underside 27 of the truck's side wall. The first portion 20 may preferably include an extension 22 which is engageable with a slot or recess 24 formed along at least one side of the track 11, for example along the inner side of the track, adjacent the truck's bed. Clamp member 18 may be slid along the length of recess 24 in order to position the clamp member 18 anywhere along the length of the track, as desired, for the particular application. In the present embodiment, three clamp members 18 are preferably positioned at a front portion (cab end), middle portion and rear portion of the length of the track attached to the sidewall of the truck. Recess 24 may be defined by a pair of curved portions 25a, 25b which together form the angled, or curved recess 24. By utilizing a curved, female recess 24 and corresponding male extension 22, the track assembly is able to fit on any truck side wall, regardless of the angle of the top surface 23 of the side wall of the truck. Alternately, the recess may not be curved, or the recess may be omitted and the clamp member may be connected at a fixed point, or formed as an extension of the elongate body 12.

Figure 4:
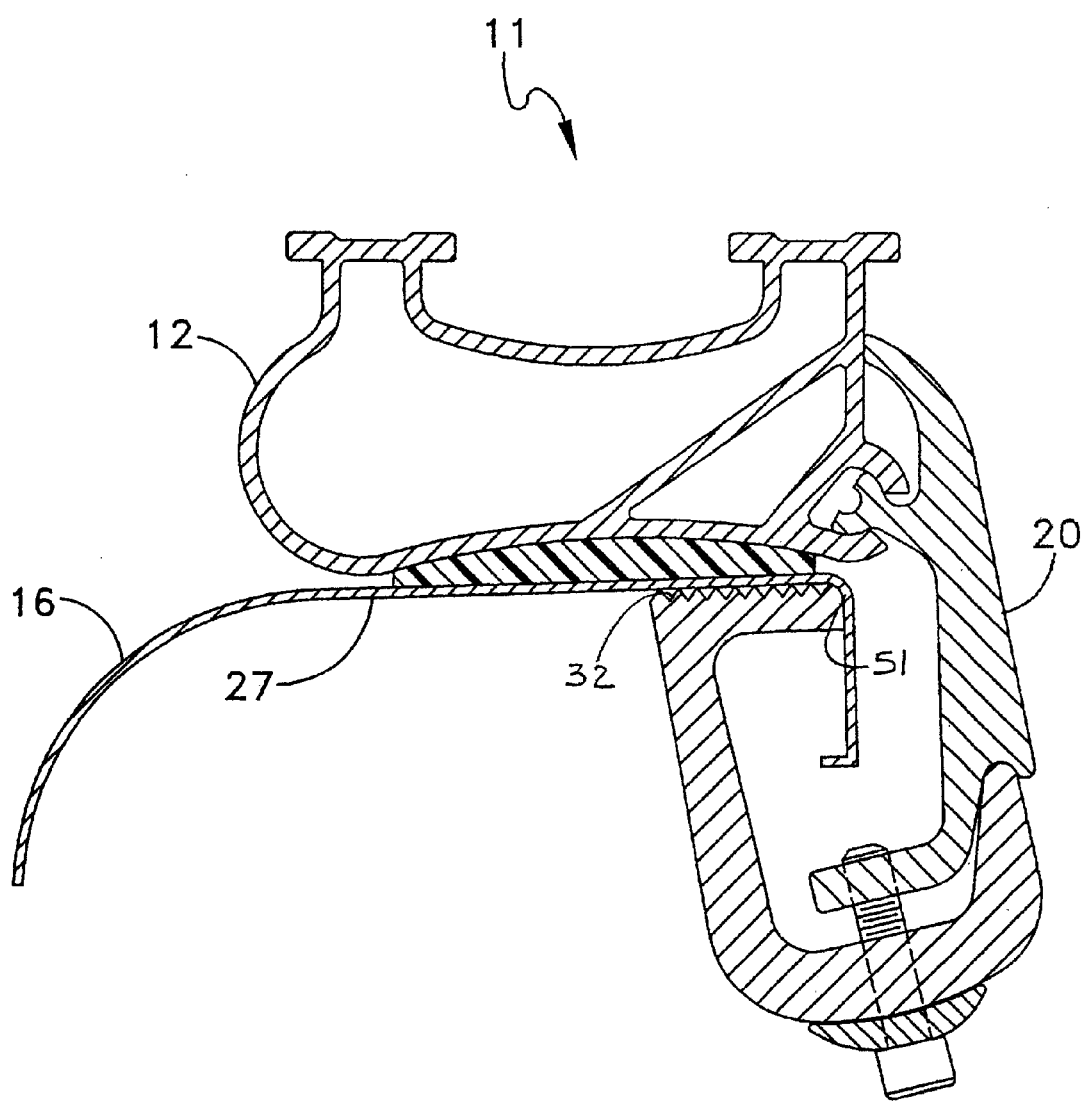
FIG. 4 is a front, cross-sectional view of a second embodiment of the clamp member of the track assembly.

In order to attach the track assembly 10 to the side of the pickup truck, the second portion 26 of the clamp member includes a gripping surface 32. The second portion may preferably have either a "C" shaped configuration or a "J" shaped configuration. The "C" shaped configuration is illustrated in FIG. 4, and includes an elongated gripping surface which extends substantially parallel to the underside 27 of the truck's side wall, and is in direct contact with the underside of the sidewall during use. In the "J" shaped configuration, the gripping surface is more or less perpendicular with the underside of the truck's side wall and engages a separate plate member 34 attached to the sidewall during use. In either case, the gripping surface is engageable with the underside 27 of the truck's side wall in order to secure the track assembly to the body to the truck.

In the embodiment of FIG. 1, the plate 34 which is positioned on the underside of the truck's side wall preferably includes a plurality of serrations (i.e. teeth 36 and grooves 37) on one side for engaging corresponding grooves 38 and teeth 39 formed as part of serrated gripping surface 32. The other side of plate 34 may include an adhesive, such as double sided tape, to position the plate member against the underside of the truck's side wall. One edge 49a of the plate 34 is preferably positioned flush against the inside lip 51 of the truck's sidewall, and the plate itself should be positioned generally flat. The provision of teeth 36 and grooves 37 on plate 34 which mate with grooves 38 and teeth 39 on gripping surface 32 allows for a mechanical fit between the second portion and the side wall of the truck in order to prevent side to side movement of the clamp member. The toothed plate also provide a secure attachment of the clamp member to the underside 27 of the side wall regardless of the taper of the truck bed. In particular, most pickup truck beds are narrower in the rear than in the front, thus the side walls angle inward from the front to the back of the truck. The ability of the present track assembly to be secured along the length of the side wall is therefore improved by the toothed plate which provides a connection between the gripping surface 32 and the side wall regardless of the truck bed's taper. Alternatively, for the "C" shaped configuration, the serrated gripping surface 32 may be engaged directly with the underside of the truck's side wall as shown in FIG. 4. In such a case, the gripping surface is preferably elongated and includes one edge 49b which is preferably placed flush against the inside lip 51 of the truck's sidewall. In the present embodiment, of the three separate clamping members, the first clamping member which is placed at the front portion of the truck bed, adjacent the cab, preferably utilizes the "C" clamp configuration, while the remaining two clamping members which are placed at the middle portion and rear portion are preferably "J" shaped.

Figure 2:
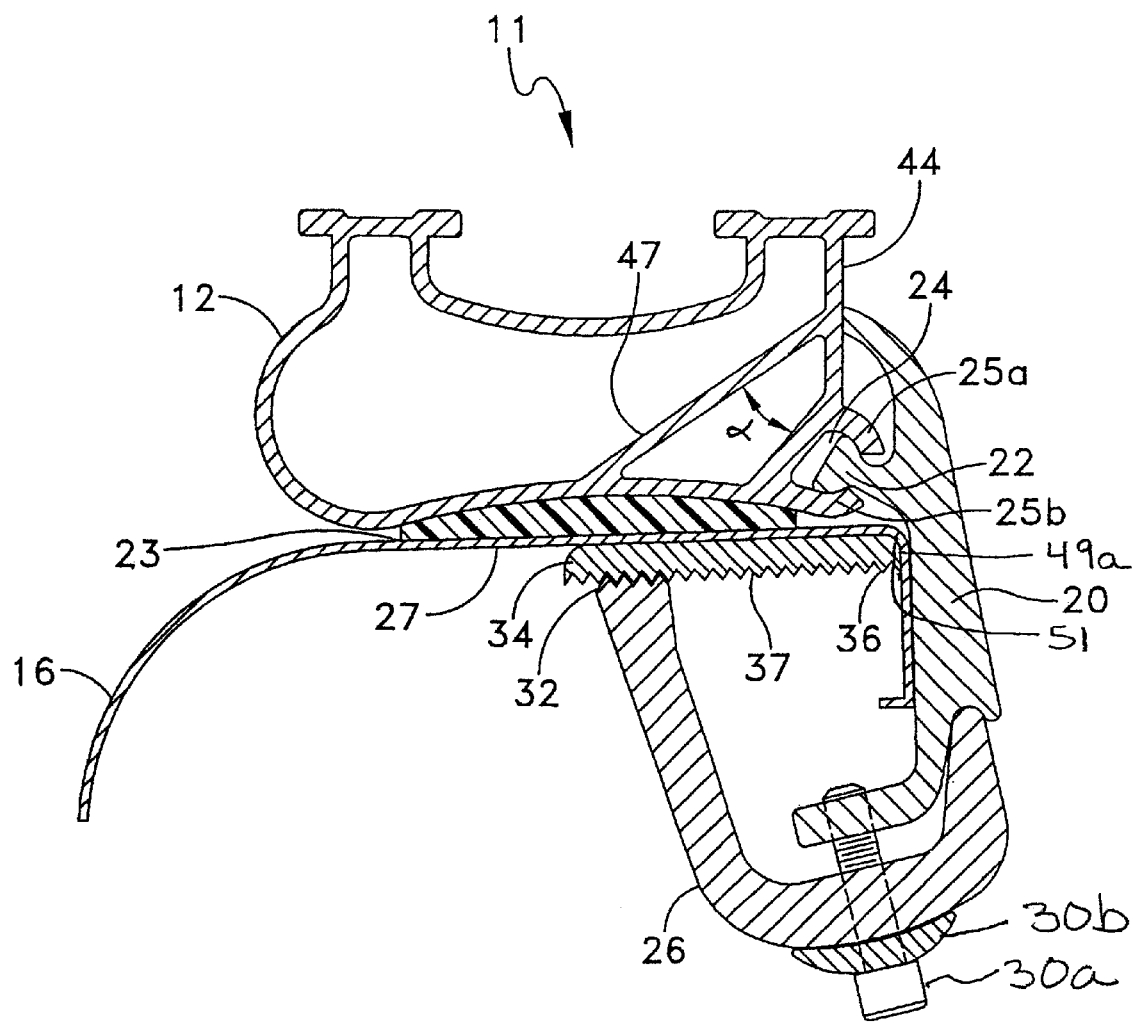
FIG. 2 is a front, cross-sectional view of the track assembly of FIG. 1 taken along line 2—2.

Second portion 26 preferably includes a second end which forms gripping surface 32, as discussed above, and a first end 28 which is preferably pivotable with respect to first portion 20. Pivoting the second portion relative to the first portion allows the clamping member to be attachable to various style and size bed liners, without sacrificing clamping force. In this manner, the second portion is movable to clear the side of the truck, while the first portion remains securely connected to the elongate body. An adjustable fastener 30 may be provided which, when tightened, pivots the second portion in order to secure the gripping surface against the underside 27 of the truck's side wall by creating a clamping force sufficient to mount the track assembly thereto. The fastener 30 may include a bolt 30a which threadingly engages the first end of the second portion and the second end of the first portion, as shown in FIGS. 2 and 4. A washer 30b may also be provided between the bolt and the second portion. When the fastener is loosened, the clamping force is released and the second portion is pivotable so as to be disengaged from the underside of the truck's side wall, and the track assembly may then be removed from the truck. Alternately, the first and second portions may be formed as a unitary member, or the clamp may be formed with more than two members, for example with three members, as shown in FIGS. 6 and 7–7D.

Figure 3:
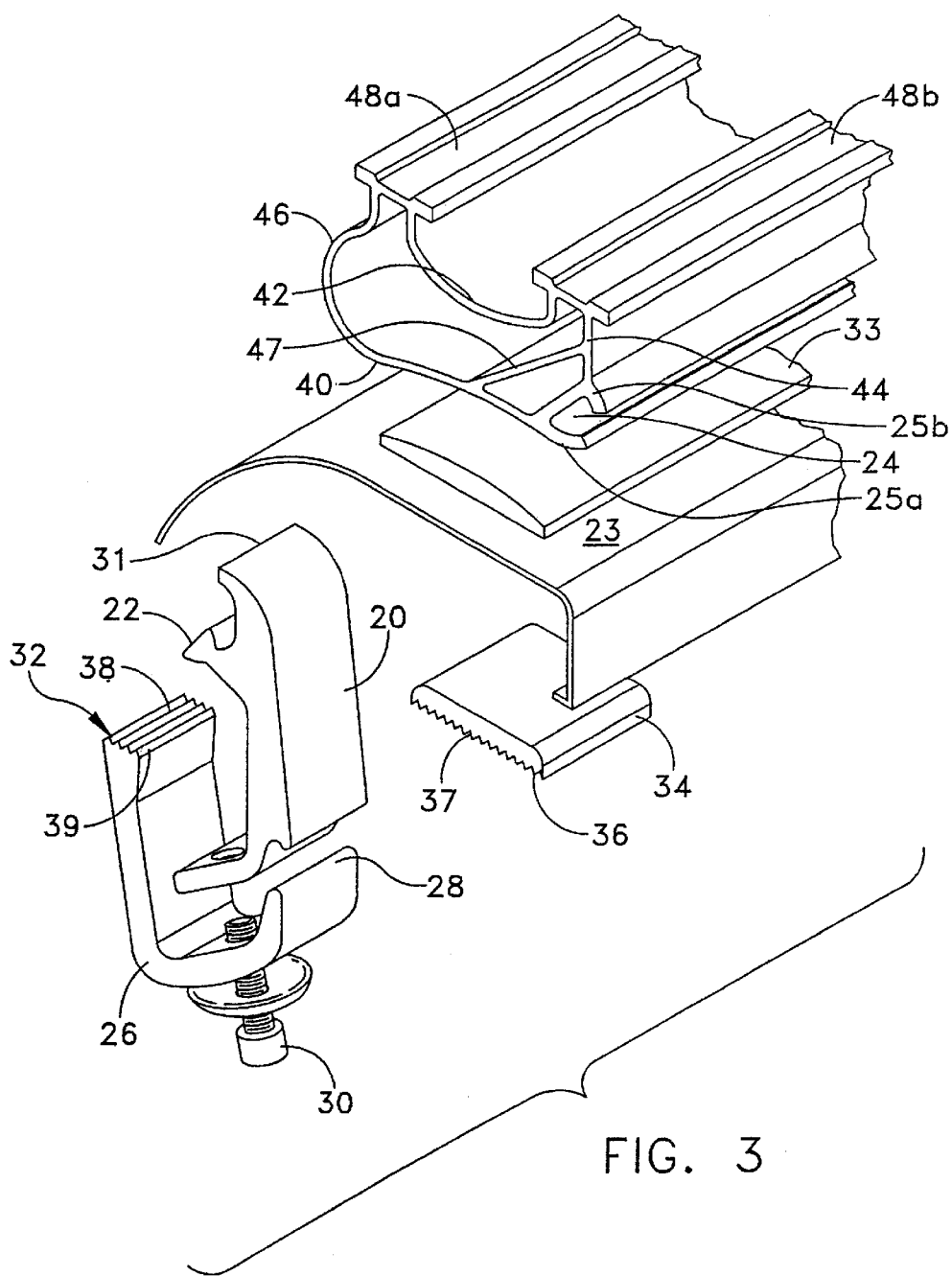
FIG. 3 is an exploded view of the track assembly of FIG. 1.

Referring now to FIG. 3, the elongate body 12 preferably includes a bottom wall 40 mountable to the top surface 23 of the side walls of the pickup truck. A shim 33 (for example a rubber shim) may be positioned between the bottom wall 40 and the top surface 23, as shown in FIG. 3, if desired, in order to help secure the elongate body. The elongate body her includes a top wall 42 opposite the bottom wall 40, an inner side wall 44 and an outer side wall 46 which connect the bottom and top walls. The inner wall 44 may preferably be substantially perpendicular with respect to the top surface 23 of the side wall 14, 16 of the pickup truck to which it is mounted. In this manner, a first end 31 of clamp member 18 engages a substantially vertical surface when mounting the elongate body 12 to the sidewall of the truck. Outer side wall 46 may also be substantially perpendicular with respect to the top surface of the side wall to which it is mounted or, alternatively, may be rounded as shown in FIGS. 1–4. Elongate body 12 also preferably includes a force transmitting diagonal member 47, which is designed to transmit the clamping force from clamp member 18 to elongate body 12, without distorting, or twisting the elongate body. Preferably the diagonal member 47 extends from inner side wall 44 to the bottom wall, at an angle of less than about 90° degrees.

Track 11 further includes at least one rail member 48 extending from the elongate body 12, with each rail member being designed to receive and attach a sliding lock assembly for mounting an overhead rack or the like thereto. Such lock assemblies are generally described in U.S. Pat. No. 5,494,327 and may comprise a lock member slidably mounted to a respective rail member so that the lock member is movable along the length of the rail member. In the present embodiment, two T-shaped rail members 48a, 48b are provided and the top wall 42 preferably forms a depression between the rail members so as to channel water off the track and away from the truck bed. Alternatively, any number of rail members may be provided, with multiple rail members giving a user added versatility for mounting items other than overhead racks to the pickup truck. As shown in FIGS. 1–4, rail members 48a, 48b preferably extend in an upward direction from top wall 42 of elongate body 12, although the rail members may also be mounted to the side walls, as desired, for mounting a variety of items to the truck. In the present embodiment, the rail members (and other components of the assembly) are formed from a high strength aluminum, such as 6000 series aluminum with an anodized finish.

Figure 5:
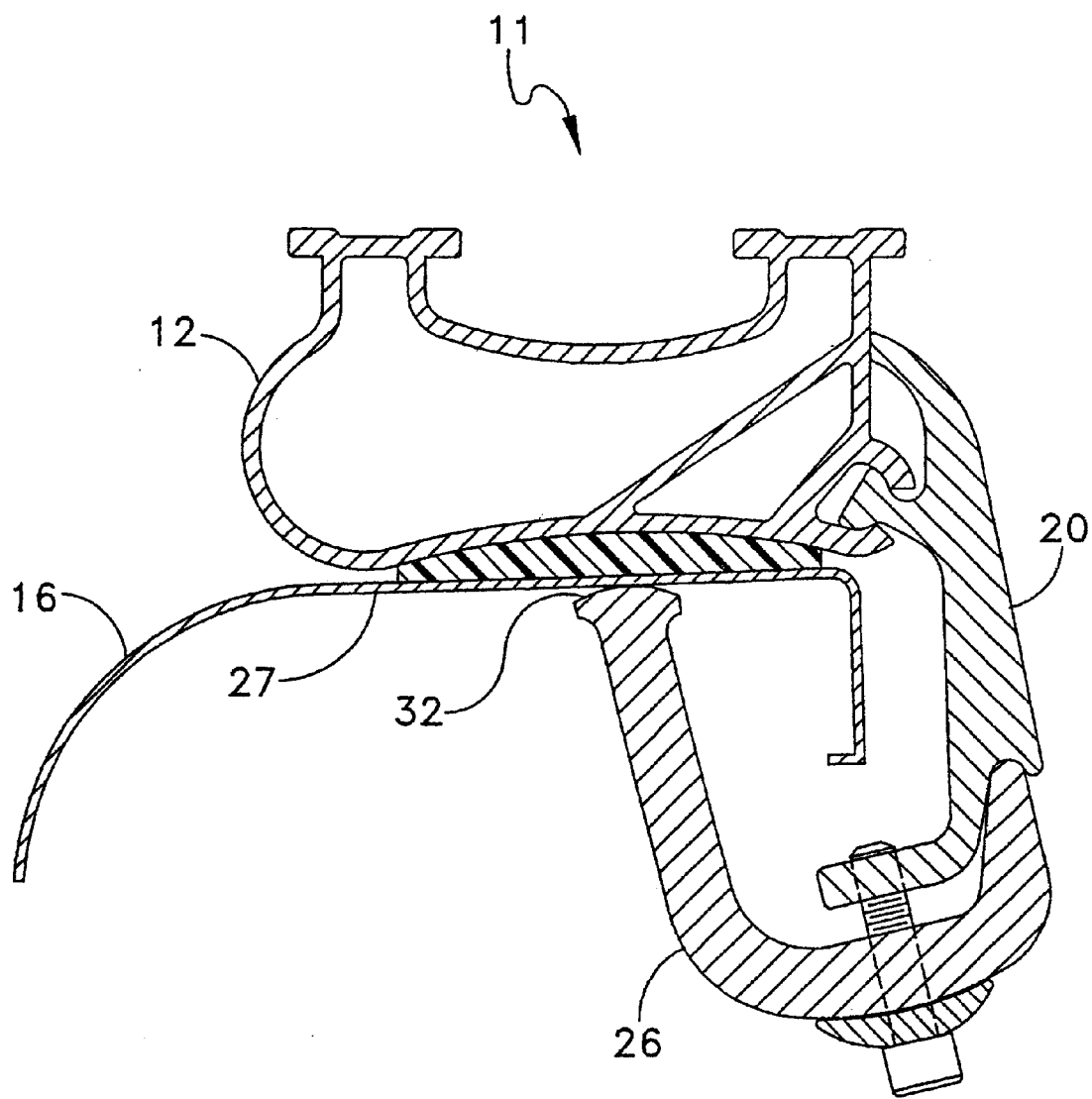
FIG. 5 is a front, cross-sectional view of an alternate or third embodiment of the clamp member of the track assembly
Figure 6:
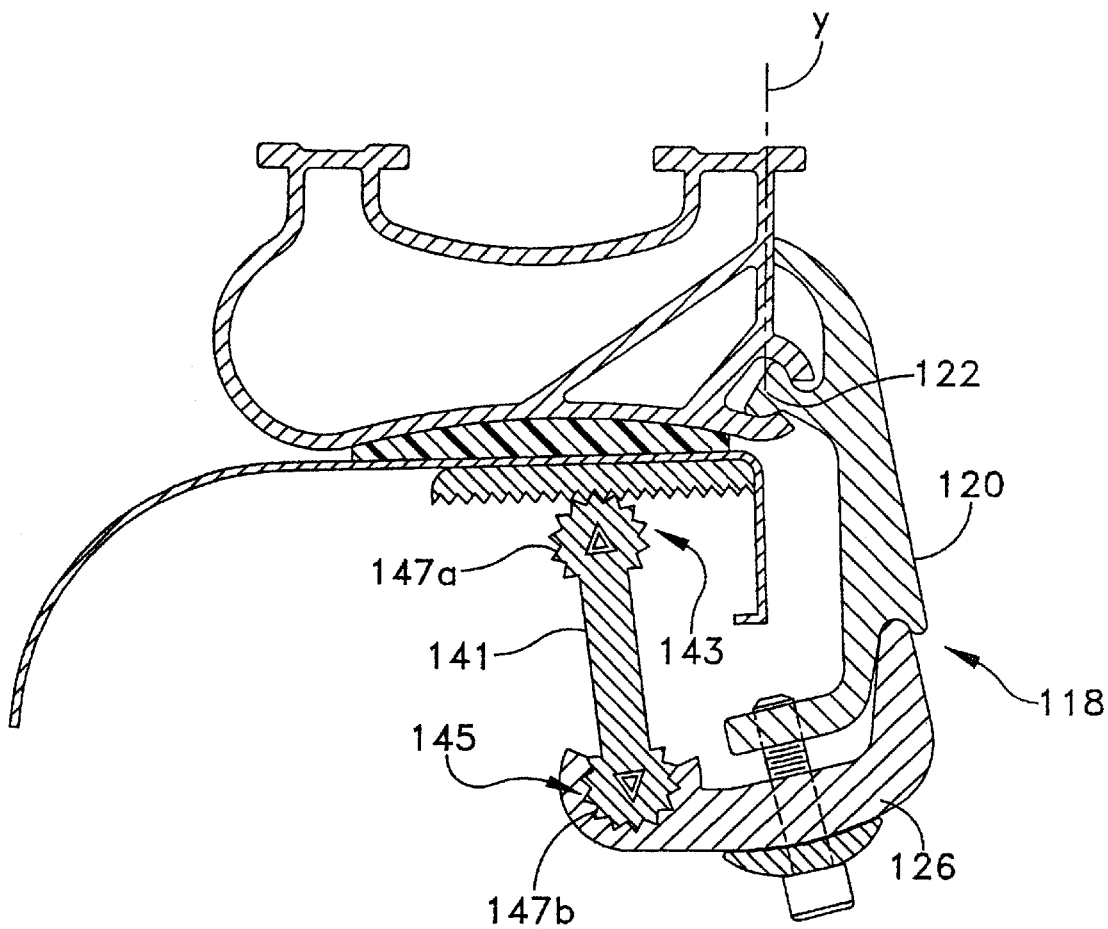
FIG. 6 is a front, cross-sectional view of an alternate embodiment of the track assembly including a three piece clamp member.
Figure 7:
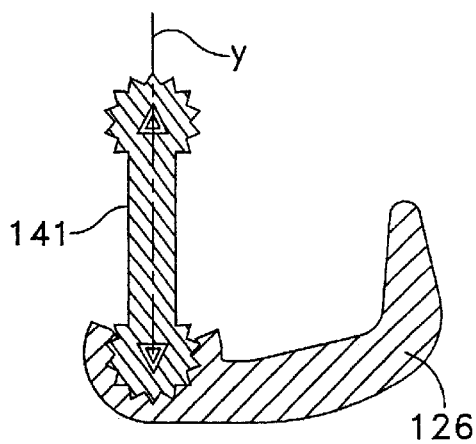
FIGS. 7–7D are cross-sectional views of a second and third portion of the clamp member of FIG. 4.
Figure 7A:
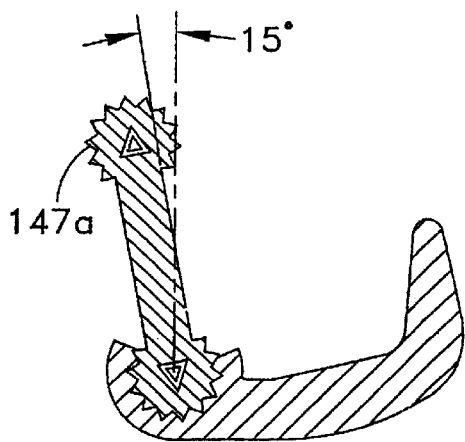
Figure 7B:
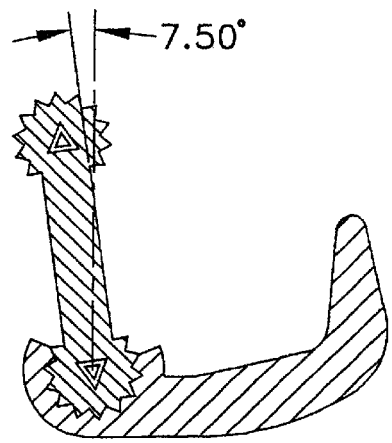
Figure 7C:
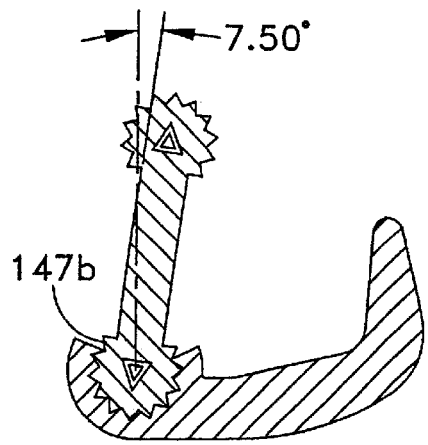
Figure 7D:
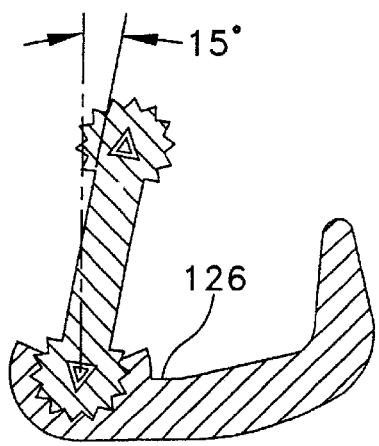

Referring now to FIGS. 6 and 7–7D, an alternate embodiment including a three piece clamp member is illustrated. In this embodiment of the track assembly, all parts which are the same, or similar to, corresponding parts in the embodiment 10 are noted with the same two last numbers, but preceded by the numeral "1". Clamp 118 includes a first portion 120 having an extension 122, and a second portion 126 pivotable relative to the first portion, as described above. However, a third portion 141 is also provided. Third portion 141 preferably includes a serrated, arcuate surface 147a at a first end 143 thereof, and a serrated, arcuate surface 147b at a second end 145 thereof, for adjustably connecting the clamp member to the side wall of the pickup truck. As shown in FIGS. 5–5D, serrated arcuate surface 147a engages corresponding serrated surface 139 of the plate member 134 which engages the underside of the side wall of the truck. Likewise, serrated arcuate surface 147b engages a corresponding serrated surface 141 of the second portion 126. In this manner, the third portion can be moved between a variety of positions in order to selectively angle the third portion relative to a vertical axis Y. For example, the third portion can be angled outwardly, toward the outer side wall of the elongate body as shown in FIGS. 5A and 5B, or inwardly, toward the inner side wall or the elongate body as shown in FIGS. 5C and 5D. Movement of the third portion, preferably between 0–25 degrees from vertical and most particularly between 7.5 and 15 degrees, allows for an adjustable mechanical fit between clamp member and the side wall of the truck in order to prevent side to side movement of the clamp member regardless of the taper or angle of the truck bed. An exemplary use of the adjustable clamp-on track assembly 10 will now be described with reference to the drawings.

In use, the adjustable and releasable clamp-on track assembly is secured to a conventional pickup truck, having a pair of spaced apart side walls 14, 16, a forward wall, bottom wall, and tailgate, which together define an open bed, as is well known in the art. Extensions 22 of the clamp members 18 may be inserted into the recess 24 of either track prior to, or after the tracks are positioned on the side walls. After the clamp members are inserted into the tracks, they are positioned by the user along the elongate body of the track. For example, when utilizing three clamp members, the user may slide the first clamp member (preferably the C-shaped clamp) to the front portion (cab end), the second clamp member to the middle portion, and the third clamp member to the rear portion of the length of the track (both second and third clamp members preferably being J-shaped). To facilitate proper location of the clamps on the truck, the user may mark the side walls of the truck at the desired locations for placement of the clamps, which will vary depending upon the truck bed, i.e. make and model of the truck.

Prior to placing the tracks 11 on the sidewalls of the truck, the adhesive side of the plate members 34 are positioned against the underside of the truck's side wall for the "J" shape clamps. A first edge 49a of the plate 34 is preferably positioned flush against the inside lip 51 of the truck's sidewall, and the plate itself should be positioned generally flat. One or more rubber shims 33 are then placed along the top surface of the sidewalls 14, 16. In the present embodiment, three shims are preferably utilized, with the first shim being placed flush to the front of the truck bed, the second at about the center of the bed, and the third about 1 inch forward of the tailgate. The shims are preferably placed such that the rounded surface of the shims face upward (so as to engage the bottom of the track in use) and are centered on the top of the side walls. After the shims are positioned, tracks 11 are supported on the side walls 14, 16 of the pickup truck such that the bottom wall 40 of the elongate body 12 rests on the rounded surface of the shims.

Once the tracks are in place and the clamps are properly positioned, fasteners 30 of the clamp members are tightened so as to pivot the second portion relative to the first portion of the clamp member. When securing the C-shaped clamp, the serrated portion of the clamping member should have one edge which is placed flush into the inside corner of the sidewall. Pivoting the second portion secures its gripping surface with the underside 27 of the truck's side wall thereby creating a clamping force sufficient to mount the track assembly thereto. The tracks should be positioned such that the rails remain substantially level. In order to remove or adjust the clamp-on track assembly 10, fastener 30 is loosened, the clamping force is released and the second portion is disengaged from the underside of the truck's side wall so that the track and clamp may be adjusted or removed from the truck.

It will be understood that various modifications may be made to the embodiment disclosed herein. For example, although described for attachment to a pickup truck, the adjustable clamp-on track assembly can be adapted to any number of suitable uses and is not just limited to pickup trucks. In addition, while being especially suited for sidably and adjustably attaching an overhead rack to the side walls of a pickup truck, the adjustable clamp-on track assembly is also well suited to mount other accessories to the side walls, such as a table saw, vice or other tools. The clamp member may also be stationary, eliminating the need for a recess in the elongate body, and the clamp member may also be of a unitary design. A smooth gripping surface may also be utilized to engage the underside of the side wall (FIG. 5), the smooth gripping surface preferably being formed of a material which will not scratch the underside of the side wall. Therefore, the above description should not be construed as limiting, but merely as exemplifications of a preferred embodiment. Those skilled in the art will envision other modifications within the scope spirit of the invention.

What is claimed is:

1. A releasable track assembly for attachment to a side wall of a vehicle comprising:

a track having an elongate body mountable to a top surface of the side wall of the vehicle, the track constructed and arranged to support a rack thereon;

at least one adjustable clamp member having a first portion supported by the elongate body and a second portion including a gripping surface supportable on an underside of the side wall of the vehicle so as to releasably mount the track to the side wall of the vehicle, wherein the track assembly is attached to the vehicle in a non-permanent manner such that a user can remove or adjust the track assembly relative to the sidewall of the vehicle by adjusting the clamp, wherein the gripping surface is serrated and includes a plurality of teeth and grooves; and a plate member attachable to the underside of the side wall of the vehicle, the plate member including a plurality of teeth and grooves for engaging the corresponding grooves and teeth on the gripping surface.

2. The track assembly of claim 1, wherein the second portion is pivotable relative to the first portion.

3. The track assembly of claim 1, wherein the gripping surface is substantially smooth.

4. The track assembly of claim 1, wherein the second portion is generally C-shaped and includes and elongated, serrated gripping surface.

5. The track assembly of claim 1, wherein the second portion is generally J-shaped.

6. The track assembly of claim 1, wherein the track further includes at least one rail member constructed and arranged to engage a sliding lock assembly and a recess constructed and dimensioned to receive an extension of the of the clamp therein.

7. The track assembly of claim 6, wherein the extension is moveable within the recess in order to position the clamp along the length of the track.

8. The track assembly of claim 1, wherein the elongate body includes a bottom wall engageable with the sidewall of the vehicle, a top wall opposite the bottom wall and a pair of side walls connecting the bottom and top walls.

9. The track assembly of claim 7, further comprising a shim constructed and arranged to provide an interface between the bottom wall of the elongate body and the top surface of the side wall.

10. The track assembly of claim 1, wherein the at least one adjustable clamp member comprises three clamp members.

11. A releasable track assembly for attachment to a side wall of a vehicle comprising:

a track having an elongate body mountable to a top surface of the side wall of the vehicle, the track constructed and arranged to support a rack thereon; and at least one adjustable clamp member having a first portion supported by the elongate body, and a second portion pivotable relative to the first portion and including a gripping surface engageable with a plate member supported by an underside of the side wall of the vehicle, the plate member including a plurality of teeth and grooves for engaging corresponding grooves and teeth formed on the gripping surface of the second portion, wherein engagement of the adjustable clamp member with both the track and the underside of the sidewall releasably mounts the track assembly to the side wall of the vehicle such that a user can remove or adjust the track assembly relative to the sidewall of the vehicle by adjusting the clamp.

12. The track assembly of claim 11, wherein the track further includes a recess constructed and dimensioned to receive an extension of the first portion of the clamp therein such that the extension is moveable within the recess in order to position the clamp along the length of the track.

13. The track assembly of claim 11, further including a shim constructed and arranged to provide an interface between the track and the top surface of the side wall.

14. A method for releasably attaching a track assembly including at least one track and at least one clamp member having a first and a second portion to a side wall of a vehicle comprising the steps of:

supporting the track on a top surface of the side wall;

inserting and sliding the first portion of the clamp member along the track;

positioning the clamp member at a desired location along the track;

pivoting the second portion relative the first portion;

engaging one end of the second portion of the clamp member with an underside of the side wall;

further securing the second portion with the underside of the side wall so as to mount the track assembly to the side wall of the vehicle; and positioning a serrated plate member on the underside of the side wall such that the second portion of the clamp member engages the serrated plate in order to avoid side to side movement of the clamp member relative to the side wall of the vehicle.

15. The method of claim 14, further comprising the step of placing a shim between the at least one track and the top surface of the side wall.

16. The method of claim 14, further comprising the step of adjusting a fastener in order to further engage the second portion with the underside of the side wall.

17. The method of claim 14, further comprising the step of releasing the second portion of the clamp from engagement with the sidewall of the vehicle.

18. The method of claim 17, further comprising the step of adjusting a fastener in order to pivot the second portion relative to the first portion so as to release the second portion from engagement with the sidewall of the vehicle.

* * * * *